(12) United States Patent
Thienpont et al.

(10) Patent No.: US 10,908,076 B2
(45) Date of Patent: Feb. 2, 2021

(54) SYSTEM AND METHOD FOR THE DETECTION OF ACRYLAMIDE PRECURSORS IN RAW POTATOES AND POTATO-BASED FOOD PRODUCTS

(71) Applicant: TOMRA SORTING N.V., Leuven (BE)

(72) Inventors: Hugo Thienpont, Gooik (BE); Wendy Meulebroeck, Deurne (BE); Lien Smeesters, Brasschaat (BE)

(73) Assignee: TOMRA SORTING N.V., Leuven (BE)

( * ) Notice: Subject to any disclaimer, the term of this patent is extended or adjusted under 35 U.S.C. 154(b) by 0 days.

(21) Appl. No.: 16/079,454

(22) PCT Filed: Feb. 23, 2017

(86) PCT No.: PCT/EP2017/054241
§ 371 (c)(1),
(2) Date: Aug. 23, 2018

(87) PCT Pub. No.: WO2017/144617
PCT Pub. Date: Aug. 31, 2017

(65) Prior Publication Data
US 2019/0086325 A1   Mar. 21, 2019

(30) Foreign Application Priority Data
Feb. 24, 2016 (EP) .................... 16157211

(51) Int. Cl.
*G01N 21/31* (2006.01)
*B07C 5/342* (2006.01)
(Continued)

(52) U.S. Cl.
CPC ............. *G01N 21/31* (2013.01); *B07C 5/342* (2013.01); *G01N 21/359* (2013.01);
(Continued)

(58) Field of Classification Search
CPC ............. B07C 2501/009; B07C 5/342; G01N 2021/8411; G01N 2021/8466;
(Continued)

(56) References Cited

U.S. PATENT DOCUMENTS 5,533,628 A * 7/1996 Tao ................... B07C 5/3422
209/580
6,864,970 B1 * 3/2005 Ruymen ............ B07C 5/342
356/237.1
(Continued)

FOREIGN PATENT DOCUMENTS

WO   2013076308 A1   5/2013
WO   2015063299 A1   5/2015

OTHER PUBLICATIONS

International Search Report and Written Opinion issued in International Patent Application No. PCT/EP2017/054241, 13 pages (Mar. 22, 2017).

*Primary Examiner* — Tri T Ton
(74) *Attorney, Agent, or Firm* — Buchanan Ingersoll & Rooney P.C.

(57) ABSTRACT

A method and apparatus for the detection of Acrylamide precursors in raw potatoes including: illuminating at least one region of a raw potato's surface with an illumination beam; measuring the intensity of light scattered by the potato; generating a detection signal based on the measured intensity of scattered light; comparing the detection signal to a predefined threshold; and classifying the potato as having a high Acrylamide precursor concentration if the detection signal exceeds the predefined threshold.

13 Claims, 8 Drawing Sheets

(51) Int. Cl.
*G01N 21/3563* (2014.01)
*G01N 21/359* (2014.01)
G01N 21/84 (2006.01)
G01N 21/55 (2014.01)
G01N 21/49 (2006.01)
G01N 21/33 (2006.01)

(52) U.S. Cl.
CPC .... *G01N 21/3563* (2013.01); *B07C 2501/009* (2013.01); *G01N 21/33* (2013.01); *G01N 21/49* (2013.01); *G01N 21/55* (2013.01); *G01N 2021/8411* (2013.01); *G01N 2021/8466* (2013.01)

(58) Field of Classification Search
CPC .... G01N 21/31; G01N 21/33; G01N 21/3563; G01N 21/359; G01N 21/49; G01N 21/55
USPC .................................. 356/432–448
See application file for complete search history.

(56) References Cited

U.S. PATENT DOCUMENTS

| | | | | |
|---|---|---|---|---|
| 2010/0059592 | A1* | 3/2010 | Barsotti | G02B 6/06 235/462.2 |
| 2014/0056482 | A1* | 2/2014 | Burgstaller | B07C 5/3422 382/110 |
| 2014/0197335 | A1* | 7/2014 | Jayasooriya | G01N 21/65 250/459.1 |

* cited by examiner

SYSTEM AND METHOD FOR THE DETECTION OF ACRYLAMIDE PRECURSORS IN RAW POTATOES AND POTATO-BASED FOOD PRODUCTS

TECHNICAL FIELD

The present invention relates to Acrylamide formation in potatoes. In particular the present invention provides a system and method for the detection of acrylamide precursors in raw potatoes.

BACKGROUND ART

To date, the Maillard reaction and the acrylamide precursors (reducing sugars, asparagine, starch, dry matter) are already widely investigated (Becalski et al., 2004; Douny, Widart, Maghuin-Rogister. De Pauw, & Scippo, 2012; Mestdagh et al., 2008; Parker et al., 2012). Current research focuses on the reduction of acrylamide formation by influencing the processing conditions, by improving the storage conditions and by applying pre-treatment techniques. The reducing sugars, asparagine, starch and dry matter are defined as important acrylamide precursors. Moreover, the processing conditions, like frying temperature and duration, have also been shown to have a large influence onto the acrylamide formation (Romani et al., 2008). Currently, a lot of research has been focusing onto the minimization of acrylamide levels in fried potatoes. The current reduction methods include the modification of the frying process, the improvement of the storage conditions of raw potatoes (storage conditions influence acrylamide formation), the optimization of the selection of raw materials and the application of pre-treatment techniques using chemical or natural additives. The acrylamide concentrations can be reduced by avoiding small and thin cut fries, by lowering the frying temperatures and by avoiding storage conditions below 8° C. (De Wilde et al., 2006, 2005; Gökmen et al., 2006). Considering the use of additives, the acrylamide formation can be reduced by pre-treatments of the cut raw potatoes with amino acids, citric acids, ions, green tea and enzymes (Jung et al., 2003; Medeiros Vinci et al., 2012; Morales et al., 2014; Pedreschi et al., 2007). However, through these adaptations the colour, taste and texture of the French fries is often adapted. Moreover, it can be hardly implemented on an industrial level. Therefore, we are interested in the use of spectroscopic detection techniques for the non-destructive identification of raw potatoes giving rise to an excess of acrylamide during frying.

A second main research activity concerns the use of visible and near-infrared spectroscopy for the determination of the composition of potatoes. The optical monitoring of dry matter, glucose and sucrose concentrations has been demonstrated (Haase, 2006; Helgerud et al., 2015; Rady, Guyer, Kirk, & Donis-González, 2014; Subedi & Walsh, 2009).

To date, unprocessed potatoes that will give rise to an excess of acrylamide cannot be detected in a fast, sensitive and non-destructive way.

It is an object of the invention to provide a spectroscopic detection technique for the non-destructive identification of raw potatoes giving rise to an excess of acrylamide during high temperature processing, without affecting the taste and structure of the products.

SUMMARY OF INVENTION

According to the present invention there is provided a method for the detection of Acrylamide precursors in raw potatoes comprising:

illuminating at least one region of a raw potato's surface with an illumination beam;
measuring the intensity of light scattered by the potato;
generating a detection signal based on the measured intensity of scattered light;
comparing the detection signal to a predefined threshold; and
classifying the potato as having a high Acrylamide precursor concentration if the detection signal exceeds the predefined threshold.

Generating a detection signal may comprise calculating the ratio of the light distributions of scattered light signals and specular reflected light signals, and comparing the ratio to the predefined threshold.

In an alternative embodiment, the step of generating a detection signal may comprise calculating the ratio of the measured intensity of scattered light detected at a first distance from the incident light beam and the measured intensity of scattered light detected at a second distance from the incident light beam, and comparing the ratio to the predefined threshold.

The threshold may be calculated by measuring the scatter pattern of at least one predetermined healthy potato and at least one potato having a high Acrylamide precursor concentration.

The method may be implemented within a sorting machine.

The present invention further provides a computer readable medium containing program instructions for causing a computer to perform the above method.

The present invention further provides an apparatus for the detection of Acrylamide precursors in raw potatoes comprising:

means for illuminating at least one region of a raw potato's surface with an illumination beam;
means for measuring the intensity of light scattered by the potato;
means for generating a detection signal based on the measured intensity of scattered light;
means for comparing the detection signal to a predefined threshold; and
means for classifying the potato as having a high Acrylamide precursor concentration if the detection signal exceeds the predefined threshold.

The means for generating a detection signal may comprise means for calculating the ratio of the light distributions of scattered light signals and specular reflected light signals, and means for comparing the ratio to the predefined threshold. In an alternative embodiment, the means for generating a detection signal may comprise means for calculating the ratio of the measured intensity of scattered light detected at a first distance from the incident light beam and the measured intensity of scattered light detected at a second distance from the incident light beam, and means for comparing the ratio to the predefined threshold.

The threshold may be calculated by measuring the scatter pattern of at least one predetermined healthy potato and at least one potato having a high Acrylamide precursor concentration.

The means for illuminating may comprise a supercontinuum light source. The means for illumination may comprise at least one laser source. The means for illumination may comprise a combination of laser sources emitting light at discrete wavelengths. The discrete wavelengths may be in the region of 1000-1600 nm. The means for illuminating may comprise a diaphragm to obtain a circular illumination spot. The means for measuring the intensity of light may comprise multiple detectors. The means for measuring the intensity of light may comprise at least one detection fiber and at least one spectrum analyser. The means for measuring the intensity of light may further comprise a collimating lens to couple detected light into the detection fiber. In an alternative embodiment the means for measuring the intensity of light may comprise at least one photomultiplier tube (PMT). The means for measuring the intensity of light may further comprise at least one diaphragm, each diaphragm used to detect only a portion of the scattered light.

The present invention further provides a sorting machine comprising the above-described apparatus.

The present invention involves screening acrylamide precursors in raw products. This may be done by illuminating the products and by measuring the intensity of the light scattered by the products at a wavelength (band) which is situated between 1000 nm and 2500 nm in order to generate a detection signal on the basis of internal scattering.

The present invention may comprise monitoring of differences in scatter behaviour depending on the concentration of the acrylamide precursor.

The specular light may be generated in the region of illumination and the internal scattered light may be generated in a region around the illumination beam with a dimension of approximately 2 cm.

Preferably the screening is performed at a specific wavelength (band) where the contrast is maximum. This may be in the region 1000-1700 nm.

The means for illuminating may be a type of spectral broadband light source, including but not limited to a deuterium/halogen combination or a supercontinuum based light source. Alternatively a laser or a combination of lasers, which may be different, may be used. The, or each laser preferably operates within a wavelength range between 1000 nm and 1700 nm.

The means for measuring the intensity of light scattered by the potato may be any form of detector (single or multi-wavelength) sensitive in a desired spectral region.

The means for measuring the intensity of light scattered by the potato may be adapted to measure a scattered intensity in a certain angle. A combination of diaphragms with different aperture sizes or ring sensors may be used in combination with a detector.

Preferably the screening is performed on peeled potato slices or fries.

The screening may be implemented within a sorting machine.

The present invention utilises spatially resolved spectroscopy to identify unprocessed potatoes giving rise to an excess of acrylamide during frying.

The present invention utilises the relationship between the optical spectra of the raw, unprocessed potatoes and the acrylamide concentration after processing. By focusing on the screening of acrylamide precursors at the start of the production process, even after cutting of the raw potatoes, potatoes unsuited for high temperature processes still can be used for other potato products, like mashed potatoes, that does not require extensive heating during their preparation process. Consequently, this increases food safety and decreases food waste.

BRIEF DESCRIPTION OF DRAWINGS

Embodiments of the invention will be described, by way of example only, with reference to the accompanying drawings in which:

FIG. 3 shows the scatter properties of stored potatoes which will give rise to an excessive acrylamide formation upon frying: (a) anti-scatter measurement result; (b) scatter measurement result FIG. 4 shows the scatter properties of fresh potatoes: (a) anti-scatter measurement result; (b) scatter measurement result.

DESCRIPTION OF EMBODIMENTS

The present invention provides a method of using spatially resolved spectroscopy to monitor the scatter properties of potatoes, enabling the identification of potatoes that give rise to an excess of acrylamide during frying.

The present invention uses spatially resolved spectroscopy to characterize the scatter properties of unprocessed potatoes. The present invention involves a measurement methodology that enables a non-destructive identification of individual potatoes and is suited for implementation in industrial in-line, scanning configurations.

Figure 1:
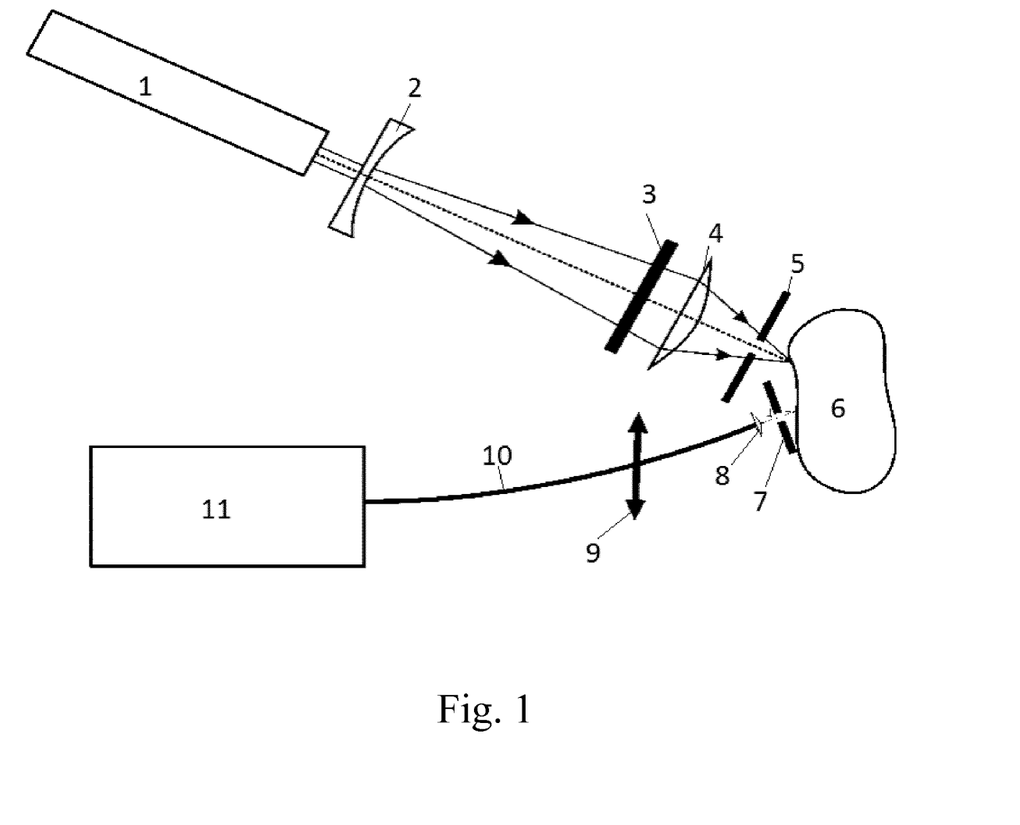
FIG. 1 shows one embodiment of a scanning measurement apparatus in accordance with one aspect of the present invention.

FIG. 1 shows one embodiment of an apparatus for the detection of Acrylamide precursors in raw potatoes in accordance with one embodiment of the present invention.

Using the apparatus of FIG. 1 it is possible to measure the reflected light spectrum at different positions along the potatoes' surface, at different distances from the illumination beam. The apparatus comprises an illumination part, in which a light beam is directed and focused onto the sample, and a detection part that collects and measures the reflected light spectrum at different positions along the sample (see also FIG. 2).

The illumination side comprises a supercontinuum light source 1, an edge filter 3, two lenses, 2, 4, and a diaphragm 5. The supercontinuum light source is a Fianium-SC400 pigtailed supercontinuum source which generates high power, broadband light through the pumping of a photonic crystal fibre by a high power pulsed laser, allowing to obtain a high signal to noise ratio of the scattered light. Specifically, it emits 4 W optical power throughout the entire 415 nm-1880 nm spectrum, of which 1.5 W is emitted by the pump laser at 1064 nm. Because the supercontinuum source emits a higher intensity at 1064 nm than at the other wavelengths, a diverging lens 2 and an edge filter 3 are provided/mounted after the output of the supercontinuum source, to flatten its spectrum by reflecting the 1064 nm light. Otherwise, if the edge filter would not be present, the spectrum analyser would be saturated by the dominant 1064 nm light. Because the edge filter can only handle a limited light power per surface area, diverging lens 2 is mounted in-between the output of the light source and the edge filter. This lens increases the spot size of the supercontinuum source, to prevent damage to the edge filter. Behind the edge filter, lens 4 focuses the light beam onto the sample 6. To obtain a circular illumination spot, a diaphragm 5 is mounted in front of the sample. The illumination spot has a diameter of 1.8 mm, at the position of the samples' surface. The potato may be positioned to have a flat potato surface perpendicular onto the illumination beam. In other embodiments of the invention one or more laser light source may be provided in which case the edge filter and diaphragm may be omitted.

When a light source illuminates a sample, the incident light rays will be absorbed, transmitted and reflected, depending on the chemical composition and the physical parameters of the sample. The reflected light of a sample is typically composed of the specular and/or diffuse reflected light from the sample surface and the internally scattered light from the sample tissue. Considering a flat potato surface, the diffuse reflected light can be neglected, due to the minor surface roughness. Part of the light will be specular reflected at the surface, with an angle of reflection equal to the angle of incidence, while another part will be internally scattered. Internal scattering occurs when the incident light rays penetrate in the sample tissue. In this case, the reflected light is emitted around the illumination position, at distances that are dependent on the tissue properties. Spatially resolved spectroscopy measures the reflected light intensity at different positions along the sample, and thus at different distances from the incident light beam. At the position of the incident light beam, the specular reflection will be captured. At larger distances from the illumination position, the internally scattered light can be measured.

Figure 2:
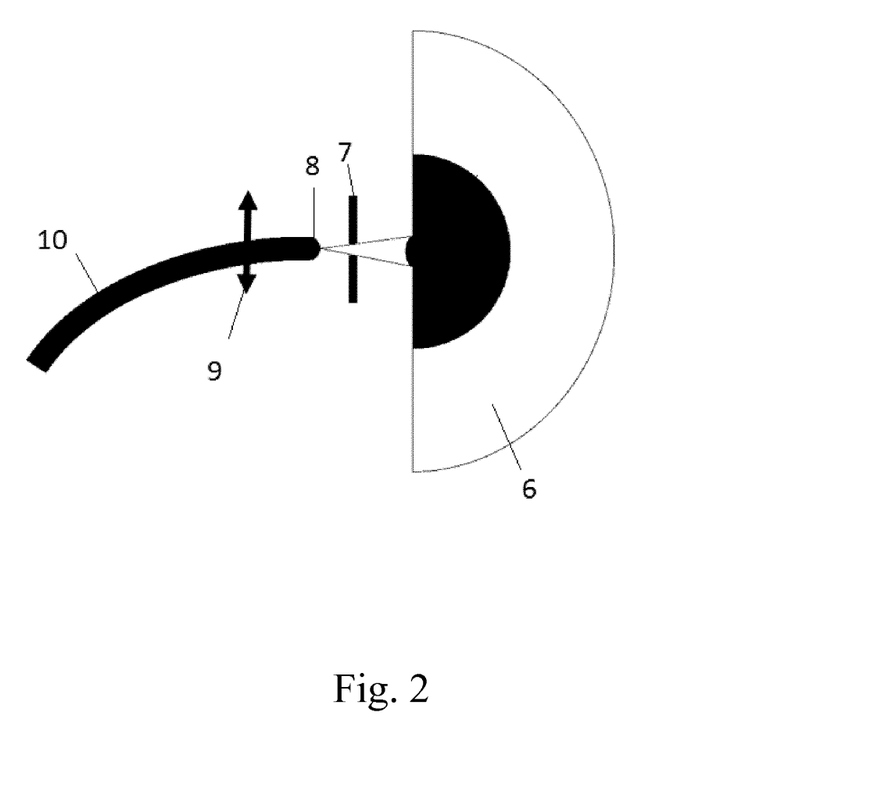
FIG. 2 shows the detection part of the apparatus of FIG. 1 in greater detail.

The detection side of the scanning apparatus of FIGS. 1 and 2 comprises a diaphragm 7, a lens 8, optical fibres 10, automated translation stages 9 and a spectrum analyser 11. The detection fibre guides the scattered light to the spectrum analyser. The detection fibre is mounted on a translation stage enabling movements in the horizontal and vertical directions (X and Y directions). Each movement may be manual or automated. The horizontal direction enables the optimization of the alignment of the detection fibre, such that the centre of the fibre passes the centre of the illumination spot. The vertical direction enables a scanning of the potato surface. During each measurement, a reflection spectrum is captured for different vertical positions of the detection fibre. The vertical movement of the may be programmed with a motion controller, to decrease the scanning duration and to increase the movement accuracy. In front of the detection fibre 10, a diaphragm 7 and lens 8 are mounted. The diaphragm 7 limits the area of the potato surface from which the detector receives light during one measurement position. The diaphragm 7 also selects a certain part of the scattering signal to be detected. The detector therefore measures a certain light intensity, which can be visualized in a scatter plot. The collimating lens 8 transmitting light from 200 nm to 2500 nm, collects the light that passes the diaphragm and couples this light into the detection fibre. Without this lens, the fibre 10 would not be able to capture all the light that is passing the diaphragm. The detection fibre 10 is connected to the spectrum analyser 11, which measures the absolute light intensity as function of the wavelength. A broadband spectrum analyser is provided, consisting of two different channels with linear detector arrays, enabling the simultaneous measurement of both the ultraviolet (UV), visible (VIS) and near-infrared (NIR) spectrum. The first channel contains spectrometer able to measure the spectrum between 200 nm and 1100 nm, with a resolution of 1.4 nm. The second channel contains a spectrometer able to measure the spectrum between 1000 nm and 1700 nm, with a resolution of 4 nm. For every vertical position of the detection fibre, the spectrum is captured simultaneously by both spectrum analyser channels.

It will be appreciated that where other detection means are provided in accordance with the present invention, the lens, optical fibres, translation stages and spectrum analyser may be omitted. The detection means may comprise one or more one photomultiplier tube detecting in free space.

The present invention enables a non-destructive identification of raw potatoes giving rise to an excess of acrylamide, without affecting the taste, structure and composition of French fries produced from the tested potatoes. Moreover, the commercial availability of 1444 nm lasers allow the integration of this identification methodology in in-line scanning machines, enabling an industrial monitoring of the acrylamide formation potential of raw potatoes.

The apparatus of the present invention is suitable for incorporation in a potato sorting machine. Prior to use, the sorting machine will need to be calibrated. By storing potatoes at 4° C. in a fridge, potatoes which will give rise to acrylamide formation during frying can be artificially created. By storing potatoes at this temperature it is possible to influence the precursor concentration. Calibration samples of both potatoes stored at low temperature and fresh healthy potatoes may be chemically analysed both before and after frying. The chemical analyses allows a comparison of the concentration of acrylamide in the fried potato and the concentration of the different acrylamide-precursors (starch, water, sugar) in the raw potato. By measuring the scatter and anti-scatter signal of healthy and refrigerated potatoes, thresholds can be defined. These thresholds may be used to classify potatoes according to their estimated acrylamide precursor concentration.

The chemical analyses allow to understand which scatter properties correspond to which acrylamide precursors concentrations. The chemical analyses also permits a correlation between the concentration of the acrylamide in fried potatoes and the scatter properties of the potato before frying, from which it is possible to deduce which chemical composition corresponds to which scatter properties. After calibrating a sorting machine, it is possible to estimate a potato's precursor concentration on the basis of measured intensities by using the given correlation that was obtained with the calibration samples.

When measuring a certain intensity, this intensity can be compared with the measured intensity of a calibration sample, the chemical composition of which is known.

The screening method allows the classification of potatoes in different subclasses. A first subclass might contains potatoes that would provoke a high acrylamide concentration (>800 ppb) during high temperature processing; a second subclass might induce a much lower acrylamide concentration (<800 ppb). Potatoes from the first subclass can be used for potato applications only requiring low temperature processing (such as mashed potatoes). The lower acrylamide concentration in the processed second class potatoes leads to healthier high temperature products (such as French fries and chips).

The method and apparatus of the present invention is able to process large batches of potatoes allowing an industrial implementation without affecting the taste and/or structure of the potato products.

TABLE 1 substituents concentrations of raw potatoes and fried potatoes (French fries), demonstrating an increasing acrylamide concentration with increasing storage time.

|  | 18 weeks of storage | | | | 28 weeks of storage | |
| --- | --- | --- | --- | --- | --- | --- |
|  | Fresh potato (stored at 8° c.) | Potato from fridge (stored at 4° c.) | French fries from fresh potato (stored at 8° c.) | French fries from potato from fridge (stored at 4° c.) | Potato from fridge (stored at 4° c.) | French fries from potato from fridge (stored at 4° c.) |
| Fructose (%) | 0.05 | 0.07 | <0.05 | 0.26 | 0.30 | 0.40 |
| Glucose (%) | 0.08 | 0.10 | 0.05 | 0.45 | 0.30 | 0.40 |
| Starch (%) | 16.85 | 18.37 | 27.62 | 31.00 | 16.91 | 26.04 |
| Moisture (%) | 77.38 | 73.05 | 51.64 | 46.76 | 75.20 | 48.92 |
| Asparagine (%) | 0.48 | 0.56 | 1.18 | 0.99 | 0.50 | 1.00 |
| Acrylamide (ug/kg) | / | / | 240 | 640 | / | 890 |

The chemical analyses results shown in table 1 confirm that the fresh and stored raw potatoes give rise to different acrylamide concentrations during frying. Consequently, scatter differences between the fresh and stored potatoes can be measured and used as an indicator for the acrylamide formation in the French fries. A fresh, non-refrigerated potato might therefore be considered a healthy potato, which would give rise to a lower acrylamide concentration (<600 ppb) than a potato that has been stored at a lower temperature or refrigerated (temperatures lower than 4° C.). The health of a potato is therefore related to its acrylamide precursor concentration. A healthy potato could be defined as one having a low acrylamide precursor concentration e.g. less than 600 ppb. For example, A refrigerated potato (temperatures lower than 4° C.) gives rise to a higher acrylamide concentration (>600 ppb). European commission recommendations on investigations into the levels of acrylamide in food 2013/647/EU are contained in (reference: http://eur-lex.europa.eu/legalcontent/EN/TXT/PDF/?uri=CELEX:32013H0647&from=EN).

It may be desirable to scan potatoes twice, to capture both the scattered and the specular reflected light signal. To obtain the scattered light signal, the spectra may be measured with a long integration time (time the spectrum analyser captures photons for one spectral measurement), for example 3000 ms and 4000 ms, for the visible and NIR channel respectively. However, this configuration does not enable the measurement of the specular reflected light. When positioning the optical fibre at the position of the illumination spot, saturated light signal will be measured. To measure the specular reflected light, the anti-scatter signal, it may be desirable to scan the potato with shorter integration times of the spectrum analyser, for example 250 ms and 1000 ms for the visible and NIR channel respectively. The spectrum may be captured at multiple positions along the potato tuber surface. These measurements of the reflection at different positions along the potato surface may occur simultaneously, resulting in real-time measurements.

Figure 3A:
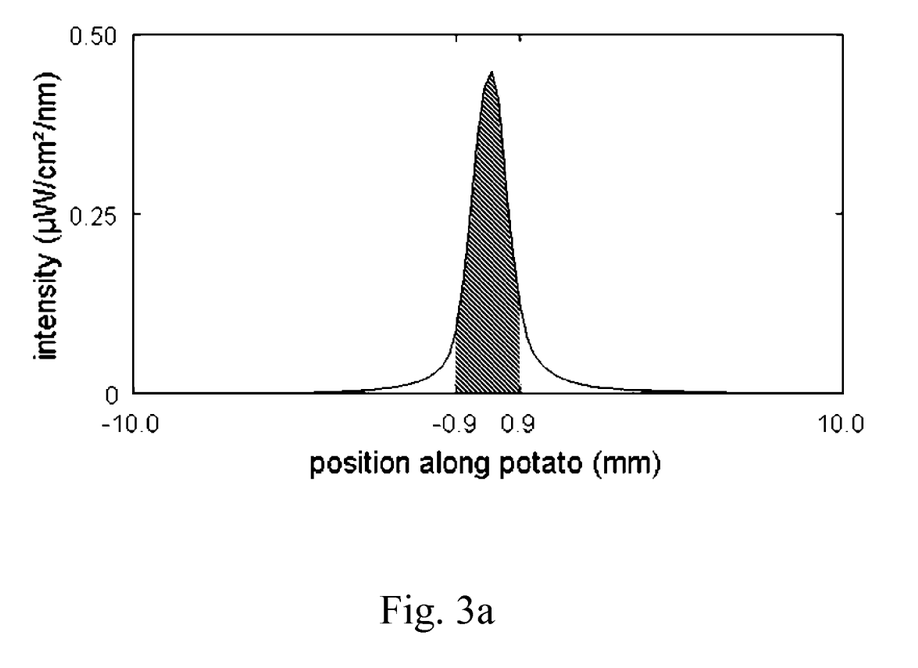
Figure 3B:
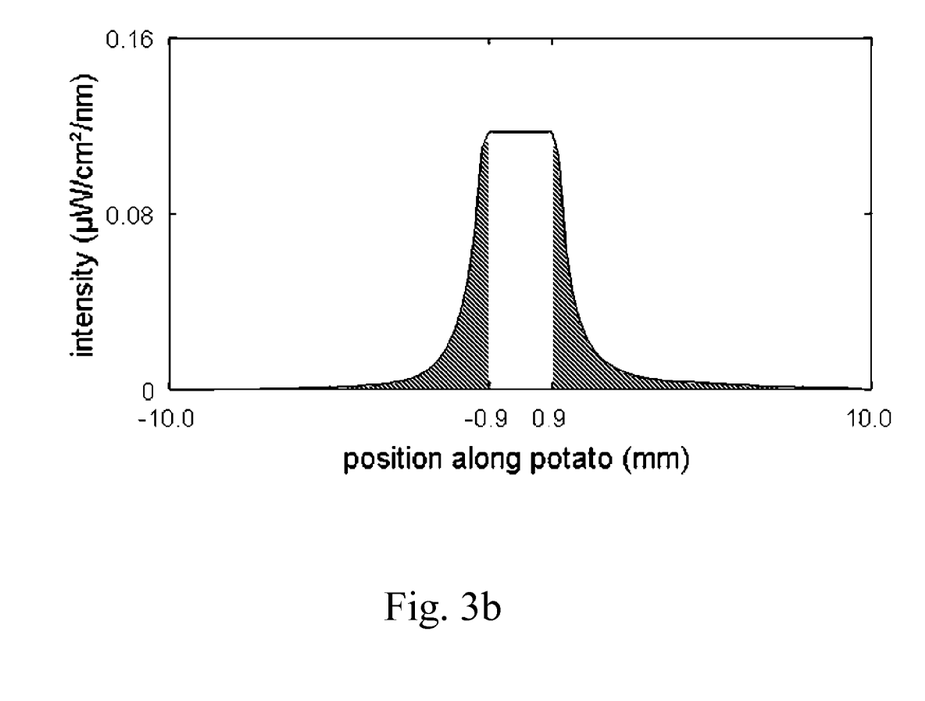
Figure 4A:
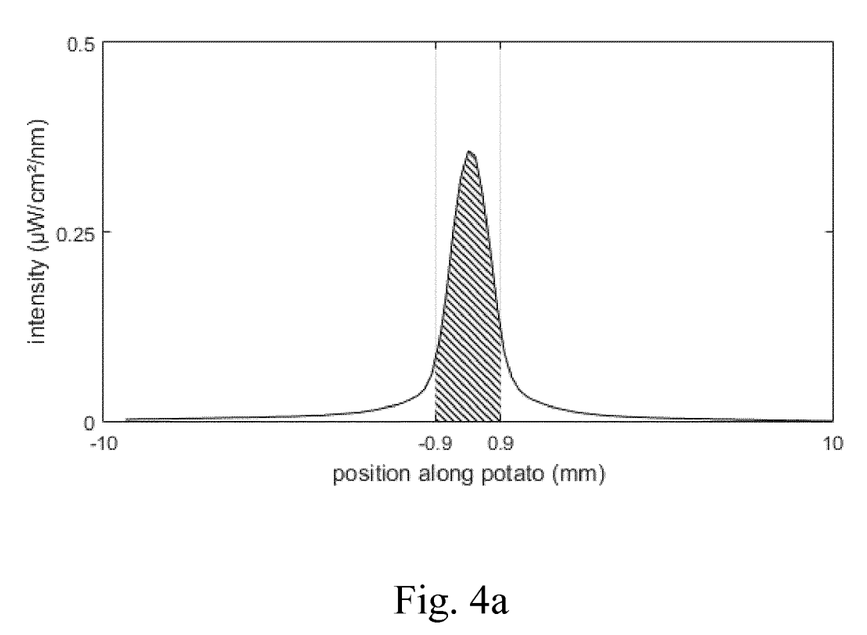
Figure 4B:
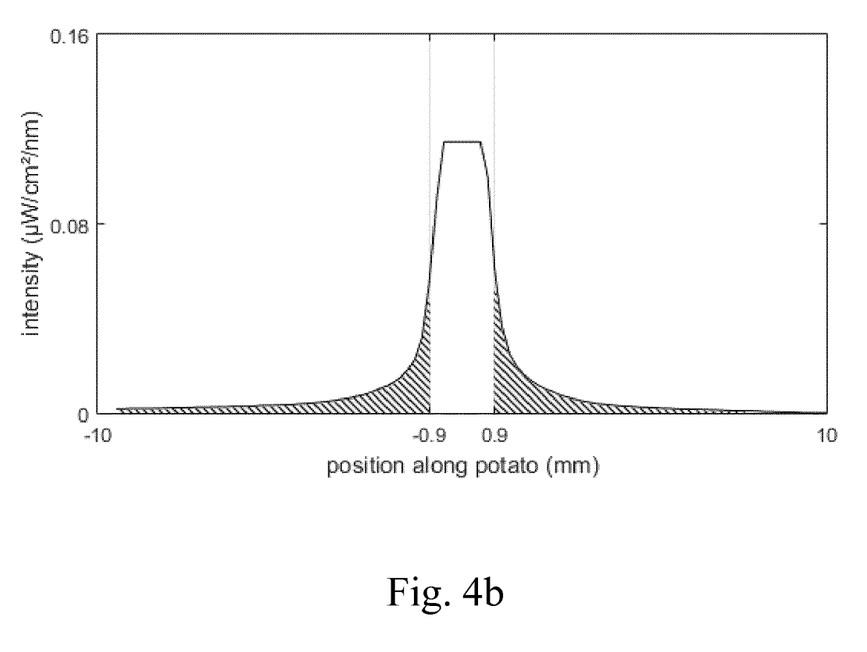

Scattering properties of fresh potatoes and those stored in a refrigerator, may be studied by measuring their scatter and anti-scatter pattern. FIGS. 3 and 4 each show a comparison of both scanning measurement configurations: (a) anti-scatter measurement result; (b) scatter measurement result. FIG. 3 shows these for refrigerated potatoes (thus susceptible to high acrylamide formation), FIG. 4 shows these for fresh potatoes not susceptible to high acrylamide formation. It is clearly visible that the fresh potatoes show less scattering than the stored potatoes.

For each wavelength, the scatter and anti-scatter pattern is obtained by mapping the measured intensity as function of the position along the potato surface. The anti-scatter profile represents the specular reflected light, as shown in FIG. 3a and FIG. 4a. It contains a small peak at the centre of the illumination spot on the potato surface (the position zero corresponds to the centre of the illumination spot on the potato surface). The scatter profile shows a saturated pattern at the position of the illumination spot, but enables the visualization of the light diffusion throughout the potato tissue, as shown in FIGS. 3b and 4b. The light intensity captured in the non-saturated area, indicated by the hatched regions, is a value for the amount of light scattering. The broader the scatter pattern, the larger the diffusion of light throughout the potato tissue.

Figure 5:
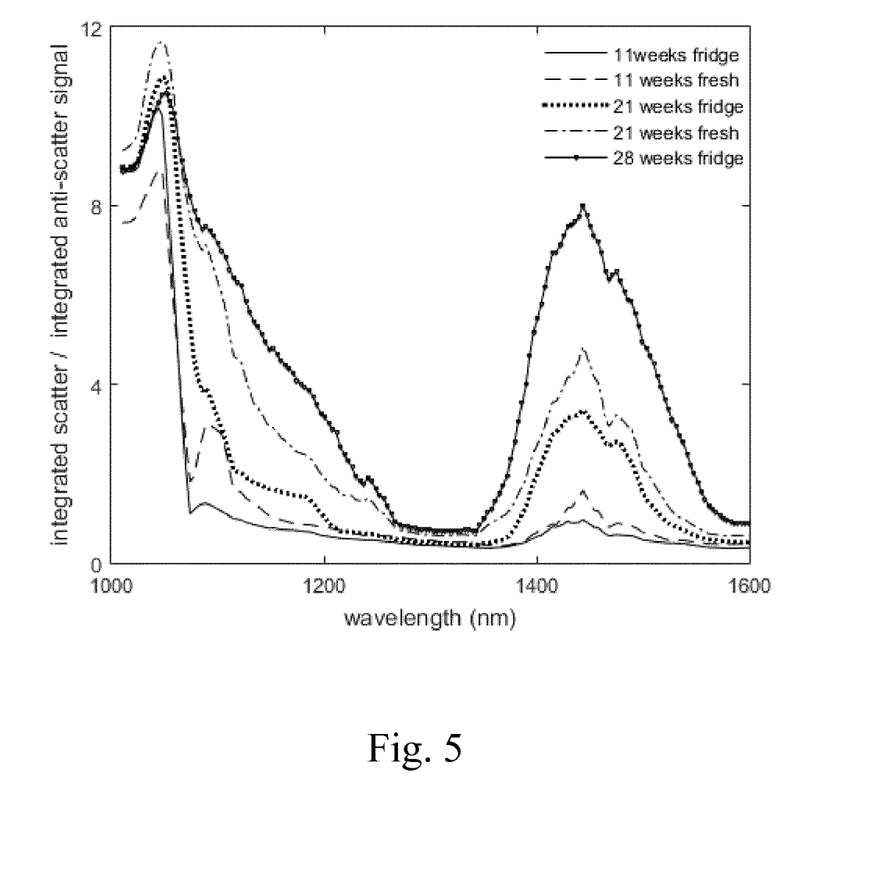
FIG. 5 shows a comparison of the scatter properties of fresh and stored potatoes, for increasing storage times.

To characterize the scatter properties of the potatoes as function of the illumination wavelength, the ratio of the integrated scatter and anti-scatter patterns may be calculated. FIG. 5 shows a comparison of the scatter properties of the fresh and stored potatoes, for increasing storage times, using the ratio of the integrals indicated by the grey areas in FIGS. 3 and 4. The investigation of the ratio of the integrated scatter and anti-scatter pattern allows a comparison between the scatter properties of the fresh and stored potatoes for the different measurement moments, after different storage times.

The mean ratios indicate a large scatter difference at 1444 nm. At this wavelength, an increasing ratio with increasing storage time can be observed. For the measurement moments after 11 weeks of storage, only a small difference between the fresh and stored potatoes was obtained, while a large increase of the ratio was obtained after 28 weeks. This corresponds with the chemical analyses that indicated a significantly higher acrylamide concentration after 28 weeks than after 18 weeks of storage (Table 1).

Figure 6:
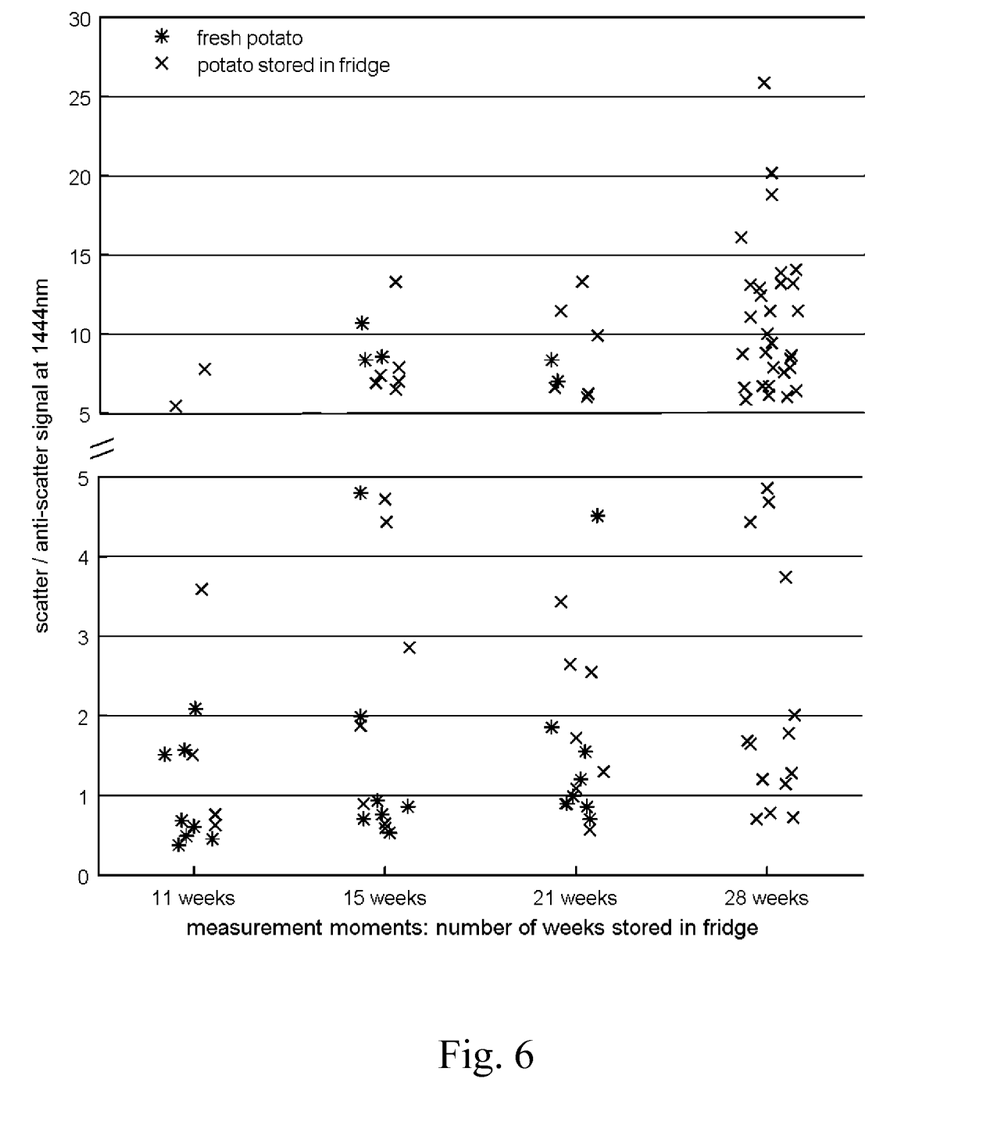
FIG. 6 shows a scatter plot visualizing the ratio of the integrated scatter and anti-scatter patterns at 1444 nm as function of the storage time.

To quantitatively study the variation and consistency of the scatter properties, a scatter plot visualizing the ratio of the integrated scatter and anti-scatter patterns at 1444 nm as function of the storage time was created. FIG. 6 shows an increasing ratio of the integrated scatter and anti-scatter signal with increasing storage time. Considering the stored potatoes, increasing values for the ratio of the integrated scatter and anti-scatter pattern at 1444 nm can be observed with increasing storage time. Moreover, the relative amount of stored potato tubers giving rise to a large ratio also significantly increases with storage time. For every measurement moment, the mean ratio of the integrated scatter and anti-scatter signal at 1444 nm shows a larger value for the stored as for the fresh potatoes (Table 2). However, a large variation on the mean ratio is observed. For each measurement moment, the fresh potato tubers show a large variation due to the large natural variation of their substituents. In comparison to the fresh potatoes, the stored potato tubers show an even larger variation. Due to the large compositional variation of the fresh potatoes, the stored potatoes will not equally adapt their internal structure, giving rise to an even larger variation after storage. Different potato tubers will thus adapt differently during storage, resulting in a different acrylamide concentration after frying.

TABLE 2 mean and variation of the ratio of the integrated scatter and anti-scatter signal at 1444 nm after different weeks of storage.

| Measurement sets | Mean scatter/ anti-scatter signal fresh potato | Mean scatter/ anti-scatter signal potato stored in fridge |
|---|---|---|
| 11 weeks | 1.0 ± 0.8 | 3.3 ± 3.6 |
| 15 weeks | 3.8 ± 5.1 | 5.0 ± 6.4 |
| 21 weeks | 2.8 ± 3.8 | 4.8 ± 6.4 |
| 28 weeks | / | 8.1 ± 12.6 |

Generally, it can be concluded that the scatter properties of potatoes at 1444 nm allow the identification of the incorrectly stored potato tubers. The larger the ratio of the integrated scatter and anti-scatter signal in the raw potato, the larger the acrylamide formation during frying. As a result, it was proven that the scatter measurements are able to sense the changes in the potato tuber composition caused by changes of the acrylamide precursors. Based on the scatter characteristics at 1444 nm, a relationship between the internal structure of the potato and the acrylamide formation during frying is demonstrated.

The internal scatter properties of unprocessed potatoes are used in the present invention to monitor the acrylamide precursors, enabling a non-destructive exclusion of potatoes that are not suited for French fries production.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A method for the detection of Acrylamide precursors in raw potatoes comprising:
    illuminating at least one region of a raw potato's surface with an illumination beam;
    measuring the intensity of light scattered by the potato;
    generating a detection signal based on the measured intensity of scattered light;
    comparing the detection signal to a predefined threshold; and
    classifying the potato as having a high Acrylamide precursor concentration if the detection signal exceeds the predefined threshold,
    wherein generating a detection signal comprises calculating the ratio of the light distributions of scattered light signals and direct reflected light signals, and comparing the ratio to the predefined threshold.

2. The method of claim 1 wherein generating a detection signal comprises calculating the ratio of the measured intensity of scattered light detected at a first distance from the incident light beam and the measured intensity of scattered light detected at a second distance from the incident light beam, and comparing the ratio to the predefined threshold.

3. The method of claim 1 wherein the predefined threshold is calculated by measuring the scatter pattern of at least one predetermined healthy potato and at least one potato having a high Acrylamide precursor concentration.

4. The method of claim 1 wherein the method is implemented within a sorting machine.

5. An apparatus for the detection of Acrylamide precursors in raw potatoes comprising:
    means for illuminating at least one region of a raw potato's surface with an illumination beam;
    means for measuring the intensity of light scattered by the potato;
    means for generating a detection signal based on the measured intensity of scattered light;
    means for comparing the detection signal to a predefined threshold; and
    means for classifying the potato as having a high Acrylamide precursor concentration if the detection signal exceeds the predefined threshold,
    wherein the means for generating a detection signal comprise means for calculating the ratio of the light distributions of scattered light signals and direct reflected light signals, and means for comparing the ratio to the predefined threshold.

6. The apparatus of claim 5 wherein the means for generating a detection signal comprises means for calculating the ratio of the measured intensity of scattered light detected at a first distance from the incident light beam and the measured intensity of scattered light detected at a second distance from the incident light beam, and means for comparing the ratio to the predefined threshold.

7. The apparatus of claim 5 wherein the threshold is calculated by measuring the scatter pattern of at least one predetermined healthy potato and at least one potato having a high Acrylamide precursor concentration.

8. The apparatus of claim 5 wherein the means for illuminating comprises a laser.

9. The apparatus of claim 5 wherein the means for illuminating comprises a diaphragm to obtain a circular illumination spot.

10. The apparatus of claim 5 wherein the means for measuring the intensity of light comprises at least one photomultiplier tube.

11. The apparatus of claim 5 wherein the means for measuring the intensity of light further comprises at least one diaphragm to detect only a portion of the scattered light.

12. A sorting machine comprising the apparatus of claim 5.

13. A computer readable medium containing program instructions which when executed by a computer cause the computer to perform the method of claim 1.

* * * * *